(12) United States Patent
Kontola et al.

(10) Patent No.: US 8,989,260 B2
(45) Date of Patent: Mar. 24, 2015

(54) USING SCALABLE CODECS FOR PROVIDING CHANNEL ZAPPING INFORMATION TO BROADCAST RECEIVERS

(75) Inventors: Kalervo Mikael Kontola, Tampere (FI); Roope Olavi Jarvinen, Espoo (FI)

(73) Assignee: Nokia Corporation, Espoo (FI)

(*) Notice: Subject to any disclaimer, the term of this patent is extended or adjusted under 35 U.S.C. 154(b) by 900 days.

(21) Appl. No.: 12/666,588

(22) PCT Filed: Jun. 26, 2007

(86) PCT No.: PCT/US2007/014727
§ 371 (c)(1),
(2), (4) Date: Dec. 23, 2009

(87) PCT Pub. No.: WO2009/002303
PCT Pub. Date: Dec. 31, 2008

(65) Prior Publication Data
US 2010/0329328 A1 Dec. 30, 2010

(51) Int. Cl.
*H04N 7/26* (2006.01)
*H04N 21/61* (2011.01)
*H04N 21/2343* (2011.01)
*H04N 21/2662* (2011.01)
*H04N 21/438* (2011.01)
*H04N 21/643* (2011.01)

(52) U.S. Cl.
CPC ... *H04N 21/6131* (2013.01); *H04N 21/234327* (2013.01); *H04N 21/2662* (2013.01); *H04N 21/4383* (2013.01); *H04N 21/64315* (2013.01)
USPC ............ 375/240.02; 375/240.27; 370/230; 370/389; 725/32

(58) Field of Classification Search
CPC .................................. H04N 21/23427
USPC ..................................... 375/240.02
See application file for complete search history.

(56) References Cited

U.S. PATENT DOCUMENTS

| 5,861,920 A | 1/1999 | Mead et al. |
| 6,275,531 B1* | 8/2001 | Li ............................. 375/240.12 |
| 6,480,547 B1* | 11/2002 | Chen et al. .............. 375/240.27 |
| 6,510,177 B1* | 1/2003 | De Bonet et al. ........ 375/240.16 |
| 6,675,385 B1* | 1/2004 | Wang ............................. 725/39 |
| 6,788,740 B1* | 9/2004 | van der Schaar et al. ..... 375/240 |
| 6,909,753 B2* | 6/2005 | Meehan et al. ........... 375/240.27 |
| 7,245,663 B2* | 7/2007 | Van Der Schaar et al. ........................ 375/240.26 |
| 7,270,730 B2* | 9/2007 | Schroeder et al. ....... 204/403.01 |

(Continued)

OTHER PUBLICATIONS

Mehdi Rezaei et al, "Tune-in Time Reduction in Video Streaming Over DVB-H" IEEE Transactions on Broadcasting, IEEEE Service Center, vol. 53, No. 1, Mar. 2007 pp. 320-328 ISSN: 0018-9316, Piscataway, NJ, US.

(Continued)

*Primary Examiner* — William C Vaughn, Jr.
*Assistant Examiner* — Luis M Perez
(74) *Attorney, Agent, or Firm* — Banner & Witcoff, Ltd.

(57) ABSTRACT

Scalable codecs are used for transmitting channel zapping data for one or more programs using timeslicing. The main codec layer may be utilized also for the zapping data, and the higher layers may be used in the primary channels. Zapping data may be provided to mobile terminals via a wireless multicast network, such as a DVB-H network, using timeslicing and providing the scalably encoded zapping data as part of the source stream.

20 Claims, 7 Drawing Sheets

(56) References Cited

U.S. PATENT DOCUMENTS

| | | | |
|---|---|---|---|
| 7,385,921 B2 * | 6/2008 | Itakura et al. | 370/230 |
| 7,463,683 B2 * | 12/2008 | Van Der Schaar et al. | 375/240.1 |
| 8,094,727 B2 * | 1/2012 | Hong et al. | 375/240.25 |
| 8,098,646 B2 * | 1/2012 | Song et al. | 370/349 |
| 8,289,370 B2 * | 10/2012 | Civanlar et al. | 348/14.12 |
| 8,291,448 B2 * | 10/2012 | Pekonen et al. | 725/32 |
| 8,761,162 B2 * | 6/2014 | Walker et al. | 370/389 |
| 2002/0054062 A1 * | 5/2002 | Gerba et al. | 345/716 |
| 2002/0183070 A1 * | 12/2002 | Bloebaum et al. | 455/456 |
| 2003/0007562 A1 | 1/2003 | Kerofsky | |
| 2004/0034863 A1 * | 2/2004 | Barrett et al. | 725/38 |
| 2006/0117371 A1 | 6/2006 | Margulis | |
| 2007/0074264 A1 * | 3/2007 | Vesma et al. | 725/135 |
| 2008/0144723 A1 * | 6/2008 | Chen et al. | 375/240.26 |
| 2008/0216116 A1 * | 9/2008 | Pekonen et al. | 725/39 |
| 2008/0273596 A1 * | 11/2008 | Oguz et al. | 375/240.13 |
| 2009/0222855 A1 * | 9/2009 | Vare et al. | 725/39 |
| 2010/0329328 A1 * | 12/2010 | Kontola et al. | 375/240.02 |
| 2012/0014434 A1 * | 1/2012 | Hong et al. | 375/240.02 |

OTHER PUBLICATIONS

International Search Report, Sep. 2008.

* cited by examiner

US 8,989,260 B2

USING SCALABLE CODECS FOR PROVIDING CHANNEL ZAPPING INFORMATION TO BROADCAST RECEIVERS

CROSS REFERENCE TO RELATED APPLICATIONS

This application is a U.S. national stage entry of PCT International Patent Application No. PCT/US2007/014727, filed Jun. 26, 2007, titled "Using Scalable Codecs for Providing Channel Zapping Information to Broadcast Receivers," the contents of which are hereby incorporated by reference in their entirety.

FIELD OF THE INVENTION

Aspects of the invention relate generally to mobile telecommunications networks. More specifically, aspects of the invention are directed to using scalable codecs for providing channel zapping information to broadcast receivers to allow fast channel switching.

BACKGROUND OF THE INVENTION

In conventional television broadcasting, whether programs are sent analog or digital, a user may quickly and easily change channels in order to see what programs are transmitted on each channel, e.g., often referred to as zapping or channel surfing. In DVB-H (Digital Video Broadcasting—Handheld) the programs are sent using timesliced IPDC (Internet Protocol Datacasting). The data of each program is sent in bursts usually using the entire or almost entire available bandwidth. The receiver portion of the DVB-H terminal is turned on only when the burst carrying the chosen program is transmitted. Between the bursts the receiver is turned off and the received (buffered) burst is rendered. Powering down between bursts saves considerable amounts of power in mobile devices with limited battery life. If the user wants to view another program broadcast, he or she has to wait until the burst carrying the desired program is transmitted. Because the time between bursts for each channel can be from a couple seconds up to 40 seconds or more, fast channel switching is not possible. Thus, it would be an advancement in the art to provide a method and system whereby users could easily and quickly change channels in a bursting broadcast environment.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to methods and systems for providing zapping data for one or more programs transmitted using timeslicing. Scalable codecs are used for transmitting channel zapping data for one or more programs using timeslicing. The main codec layer may be utilized also for the zapping data, and the higher layers may be used in the primary channels. Zapping data may be provided to mobile terminals via a wireless multicast network, such as a DVB-H network, using timeslicing and providing the scalably encoded zapping data as part of the source stream.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
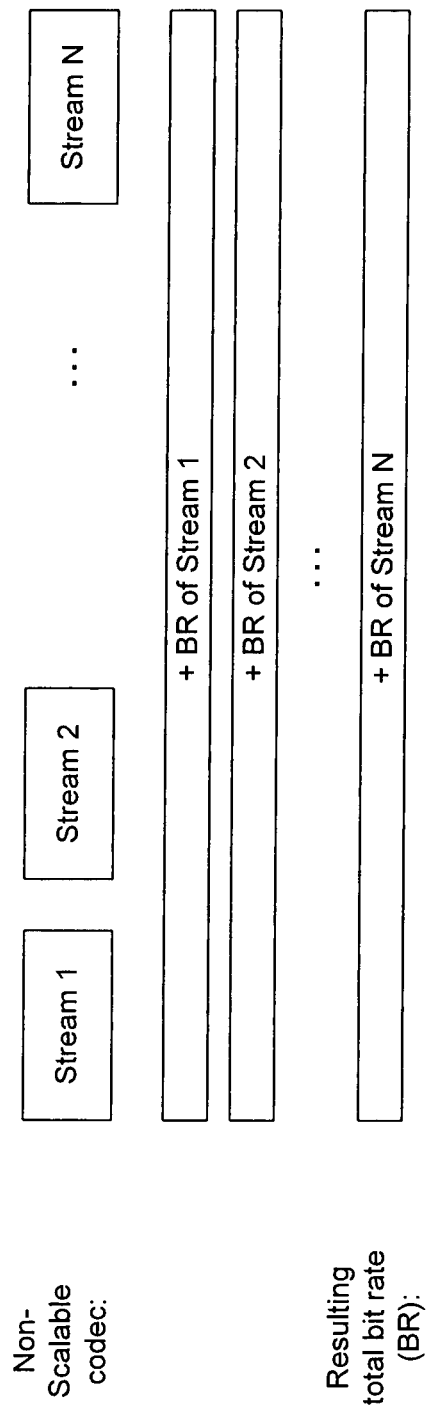
FIGS. 1 and 2 show bit streams and resulting bit rates for non-scalable and scalable coding respectively.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Multimedia broadcasting is becoming a popular use case in various systems, including, but not limited to, IP datacasting (IPDC) over DVB-H. Mobile DTV (MDTV) is a North American version of IPDC, and competitors to them are Korean digital multimedia broadcasting (DMB) and Qualcomm's MediaFlo.

IPDC sends data in bursts and each burst contains one or few services, as mapped by the service provider. As mentioned above, when a user changes to the next service (also referred to as a "radio channel," "radio station," or "primary channel"), then that may be referred to as "channel browsing" or as "channel zapping". The time interval between two successive data bursts depends on the used bit rate, but should not be more than about six seconds. It is typically approximately 1-2 seconds. When services are in the same burst, then a terminal user can switch quickly to the next service. But, if different services are in different data bursts, then there may be a delay of between zero and six seconds, depending on when the next burst is available. That switching time can be reduced so that before the next burst is available, a lower bit rate version of the same content is rendered. Such content is sent in dedicated zapping channels. In IPDC, the support of zapping channel is optional. FIGS. 1-4 show various ways to include separate zapping channels. For example, zapping channels could be transmitted after Electronic Service Guide (ESG) data, with ESG-data, time-wise parallel to services, or after each service.

Zapping support can be provided to the user with two options from the Electronic Service Guide ESG point of view: (1) dynamic zapping, where the zapping support is provided, not as part of the Electronic Service Guide (ESG) data, so it can be dynamically changing; and (2) static zapping, where the zapping Support is provided in the ESG.

A dynamic zapping service is a streaming service on a separate (Internet Protocol) IP flow in a separate zapping burst. Such a service contains complementary content about the associated main streaming service. When the zapping content is synchronized with the main stream then the zapping content is updated continuously, i.e., dynamically. Such zapping content could be, for example, a copy of the audio/video content with reduced performance, a still picture showing the latest snapshot out of the current video or dynamic text such as subtitles. Also, a combination of the aforementioned is possible.

On the other hand, static zapping content is provided in ESG auxillarary data. Static zapping content tries to give an impression of the main audio/visual (A/V) streams by graphics or simple text. Thus, static zapping content data is not updated or synchronized with the main streaming service, but is transported significantly in advance relative to the streaming content service.

In "traditional" non-scalable coding for various desired quality levels, or available bit rates, separate bitstreams are encoded and saved at the server side. Then, a server sends each such bit stream separately, and a decoding client device decodes the separate bit streams. In some streaming applications, bit streams could be changed during service when using extra negotiations. Moving Picture Experts Group (MPEG) has specified its MPEG-4 Advanced Audio Coding—Low Complexity (AAC LC) that is an example of such an audio codec.

With scalable coding, low resolution data is encoded into a core stream layer (also referred to as a base stream layer) and higher resolution data is achieved by using one or more separate enhancement layers with that core stream layer. A core stream typically contains a full rough representation of the information to be transmitted, i.e., the resulting quality is acceptable as a low bit rate version but some encoding artifacts are audible or often also audio bandwidth could be limited.

In certain embodiments, the enhancement layers include information that improves the quality of the core stream layer, for example by increasing the audio or video bandwidth, or adding more image detail and reducing coding artifacts that are caused by lossy coding algorithms. Typically, an enhancement layer alone cannot be converted into a representation of usable information, it has to be used together with the core stream layer. An enhancement layer may have a lower bit rate than the core stream layer, or it may have a higher bit rate than the core stream layer. By defining the bit rates for the core stream layer and the one or more enhancement layers and the relation between their respective bit rates, the quality and the quality relation of the information coded in the core stream layer and the core stream layer when decoded with one or more enhancement layers can be defined.

By using a core stream layer and one or more enhancement layers, at the server side, a single copy of the content (i.e., the core stream and the associated enhancement layers) may be saved. The resulting total bit rate of such files is the sum of the bit rate of the base layer and the bit rates of the enhancement layers. MPEG-4 AAC Scalable and MPEG-4 Bit-Slice Arithmetic Coding (BSAC) are examples of scalable audio codecs. They may run over normal non-scalable codecs, and, therefore, the base layer could be at the lowest level even 10 to 20 kbps.

When a server is sending a scalable bit stream, then the used layers can be selected according to an available bit rate and/or a desired quality. In practise, that would be a "cumulative combination" of the core stream and a selected amount of layers. If streaming of content is not expensive, then a server may send the full stream, and then it is up to the decoding client devices to select which layers they are decoding and which layers they will simply ignore. That selection could be also changed in real-time, e.g., due to changes in the network condition. Because the core stream is the most important part of the bit stream, it could have the highest priority in transmission, or it could get more forward error correction, etc. For example, when there is network congestion, then an advanced network device would be able to drop the lower priority enhancement layers in order to enable transmission of the higher priority core streams.

Figure 2:
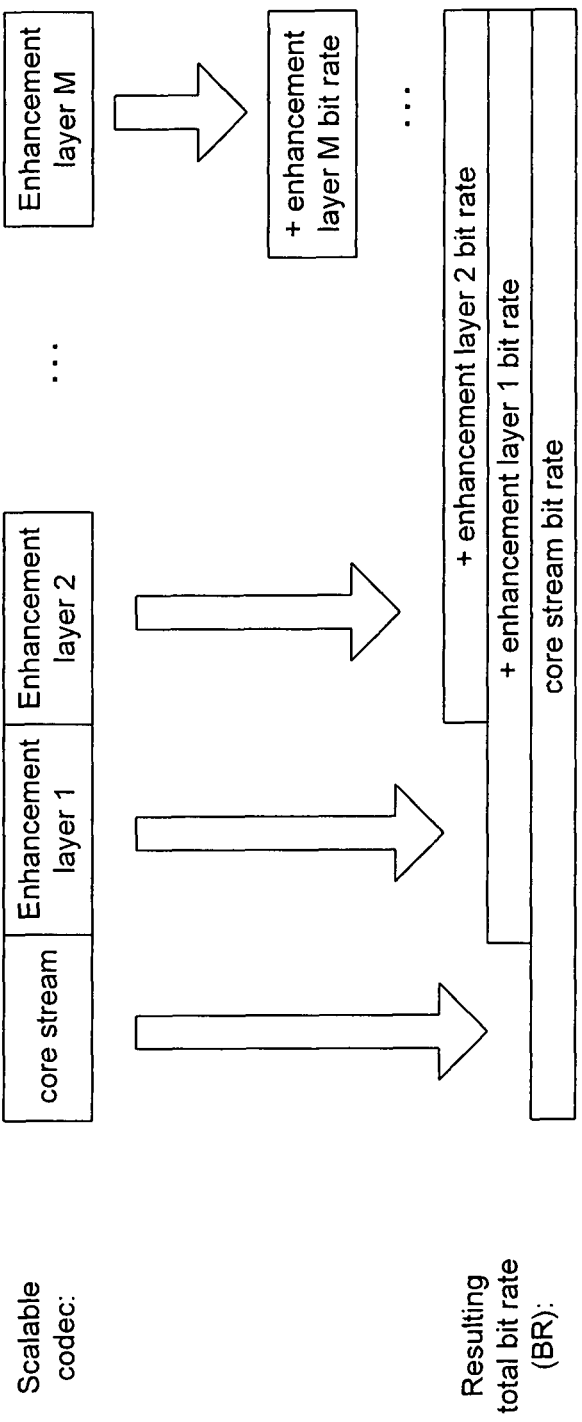

FIGS. 1 and 2 show bit streams and resulting bit rates for non-scalable and scalable coding respectively. The resulting total bit rate increases as a function of N.

In wireless streaming, the bit rate per stream should be as low as possible due to transmission costs, power consumption of the receiver, and similar considerations. Thus, even if the layered scalability can result in the overall bit rate reduction in the case when many layers are streamed together, then the situation is different when it is compared to the case when streams are streamed separately because in the latter case the total bit rate per stream per encoded content item is less than in the former case. Therefore, for wireless multimedia streaming standards like Third Generation Partnership (3GPP) Multimedia Broadcast/Multicast Service (MBMS) and Packet-switched Streaming Service (PSS), non-scalable codecs have been selected to achieve an optimal performance per stream. The current Release-6 (and soon finalized Release-7) versions of those standards use H.263, MPEG-4 Part 2 or MPEG-4 Part 10 (aka AVC/H.264) for PSS for several reasons. For newer MBMS service AVC is used. For audio services both Adaptive Multi-Rate—Wideband (AMR-WB+) and High Efficiency AAC v2 (HE AAC v2) decoding can be implemented.

When codecs for IPDC over DVB-H were selected, the harmonization of components between 3GPP and IDPC was one target because it can be expected that many mobile device would support both those standards. Therefore, the codec lists of IPDC and 3GPP are very similar; in IPDC for video AVC/H.264 is used again, and for audio HE AAC v2 and AMR-WB+. In IPDC service, however, Video Code 1 (VC-1) may be used, but not those older H.263 and MPEG-4 Part 2. IPDC applications are divided into a few capability classes according to the used video and audio coding parameters.

When an optional IPDC zapping service is used, then each zapping stream is sent separately, in addition to the used main channel.

Even if relatively high resolution zapping channels are desired, a significant issue with their usage is that they either consume part of an overall bit budget or they increase the total bit rate. In the former case, the quality of primary channels is reduced, and a good trade-off should be found (e.g., balancing the audio/video quality for mostly used primary channel versus the audio/video quality for channels that are used for channel zapping (i.e., new channel selection)). If the total bit rate is increased due to usage of the zapping channels, then it results in increased power consumption.

When a user is listening to a single radio program for a relatively long time and is not using channel zapping, then sending channel zapping data in a parallel channel is an unnecessary overhead.

Also, supporting channel zapping increases the complexity in the receiver side because the receiver decodes two or more separate streams (e.g., the primary channels and the lower bit rate zapping channel that might use different encoding tools etc).

Zapping content is not yet used much, but content streams for primary channels and zapping channels are encoded and sent separately. Thus, even if optimal bit rates were used for both the primary channels and the zapping channels, then the overall bit rate would no longer be optimal. And supporting separate zapping channels increases the complexity of the system. This is because such a system handles multiple streams, initializes codecs for the streams in the beginning of the service, and the sender side also encodes the zapping content and synchronizes the zapping content with the corresponding primary channels.

In accordance with various aspects of the invention, instead of sending separate better quality primary channels and lower bit rate zapping data, scalable codecs are used for sending both the primary channels and the zapping data. The main codec layer is the core stream layer and may be used for the zapping data, and the higher layers (also referred to as enhancement layers) may be used in the primary channels. In this way, the overhead associated with a separate zapping channel that duplicates content from an associated content service is avoided. In that way the receiver may process the same kind of bitstreams; either the core stream or both the core and one or more associated enhancement layers.

Figure 3:
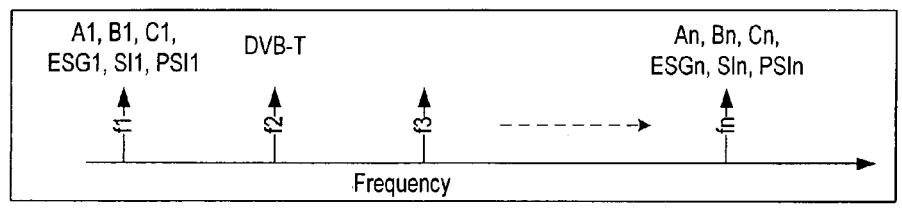
FIG. 3 illustrates channels in a wireless broadcasting network.

FIG. 3 illustrates physical channels (e.g., radio channels) f1, f2, f3 and fn in a frequency band used, e.g., for DVB transmissions. In the example frequency band, channel f1 may be used for timesliced IP datacasting (IPDC) transmissions. On frequency f1 a number of IP services, or programs, may be sent. Programs may be grouped into logical channels A1, B1, C1 each comprising one or more services, or programs. Additionally, Electronic Service Guide (ESG) data, Service Information (SI) data, and Program Specific Information (PSI) data may be transmitted on the same physical channel f1. As used herein, either the term service or program may be used to refer collectively to services and programs. Other frequencies may carry other programs or services. E.g. a DVB-T service may be sent on f2. On frequency fn, services An, Bn, Cn, ESGn, Sin, and PSIn may be sent, as illustrated in FIG. 3.

Figure 4:
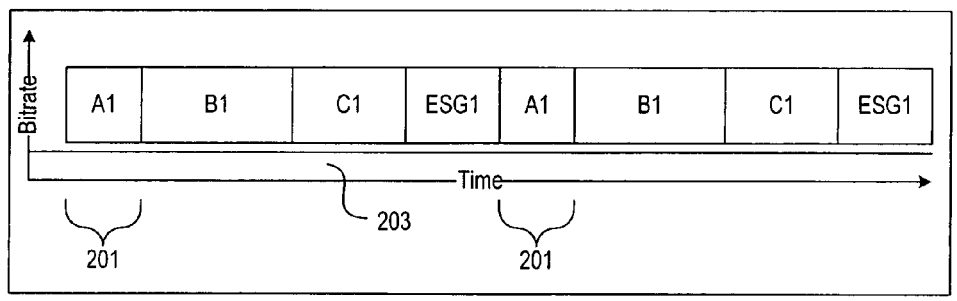
FIG. 4 illustrates data in a time slice sequence according to an illustrative aspect of the invention.

FIG. 4 illustrates timesliced transmissions on a sample frequency, here f1, in a simplified example. Each logical channel A1, B1 and C1 comprises one or more IP services, or programs. Data corresponding to one or more IP services of the logical channel may be transmitted as a single burst using all or most of the available bandwidth of the physical channel during that time slot. The logical channel may also be thought of or referred to as a timesliced channel. For receiving an IP service in a timesliced channel, e.g., A1, the receiver is turned on for the duration 201 of the burst carrying channel A1 data. The maximum burst duration is signaled in SI data 203. A time to next burst (delta-t), the end of the burst/frame, and any application data table and/or RS data table may be signaled as real-time parameters in the transmitted MPE section headers (not shown). A receiver receiving the transmission may filter the corresponding packets from the received burst in order to receive a selected program in the channel. In the example of FIG. 4, A1, B1, and C1 are timesliced elementary streams (timesliced channels) each comprising one or more IP services. An Electronic Service Guide (ESG) comprising information on the hierarchy and/or content of the services, transmission times and other service related information associated with the available services or programs of the timesliced channels A1, B1, and C1 may be transmitted as a separate burst, as illustrated in FIG. 4.

Because data in the ESG might not be descriptive enough for a user regarding the content of a program, or because the user wants to see at what point a program is presently being broadcast, the user decides to switch channels in rapid succession to learn what is being broadcast in other ongoing programs. This is also known as channel zapping. However, because the time between bursts for each channel can be up to 40 seconds or more, an illustrative aspect of the invention may provide zapping data to the receiver. The user can then review the zapping data when desiring to rapidly see what is being broadcast on other channels. The zapping data may be consumed in the receiver by a client zapping application. The zapping data may present to the user a view of ongoing programs being broadcast on a number of available channels.

As mentioned above, in accordance with an illustrative aspect of the invention, scalable codecs may be used for sending both the primary channels and the zapping data. The main codec layer may be used also for the zapping data, and the higher layers (also referred to as enhancement layers) may be used in the primary channels.

Figure 5:
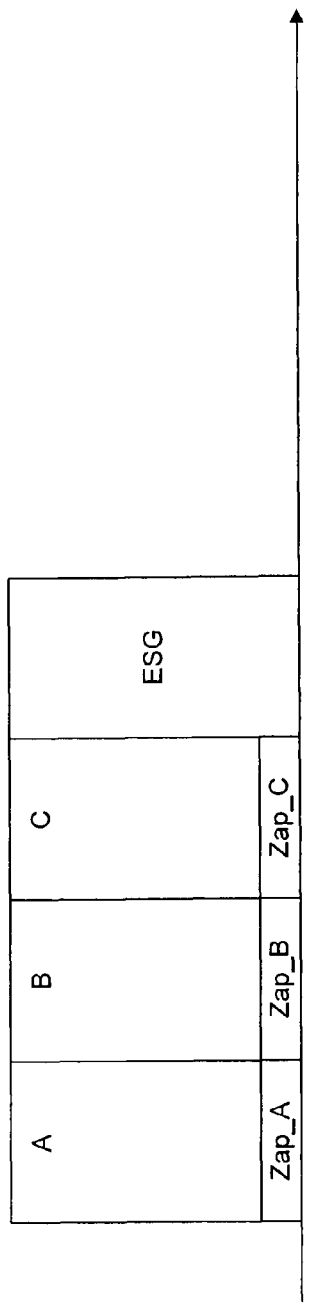
FIG. 5 shows channel zapping information sent in separate bursts during original bursts in accordance with an aspect of the invention.

FIG. 5 shows channel zapping information sent in separate bursts during original bursts, which may be referred to as bit-rate interleaving, in accordance with an aspect of the invention. FIG. 5 illustrates time sliced zapping content transmission, where zapping bursts are sent in parallel with content services. Small zapping bursts, each of which contains content from a single service burst, are provided.

While in a normal mode, receivers receive the time sliced channel A (including, for example, programs 1, 2, 3, 4)+"zapping" time slice channel Azap (including zapping frames for programs 1, 2, 3, 4). In a zapping mode, the receiver may receive all zapping channels Az . . . Nz, including zapping frames from all programs. Receivers are preferably capable of receiving substantially all the zapping program in zapping mode.

Advantages of this method of providing channel zapping information include that no extra capacity is required from the air interface as content for zapping is only logically separated from original content, and MPE-FEC interleaving depth is the same as original burst interleaving depth. However, receiver filtering and buffering becomes more complicated as both "real" and "zapping" time slice channels need to be received. In addition, in zapping mode, the receiver needs to be "on" all the time, and zapping content modifications are not possible at the transmitter side as zapping content is also content for actual service. However, modifications to the zapping information may be carried in the ESG. For example, text transmitted in the ESG may be overlayed on a displayed zapping channel.

Figure 6:
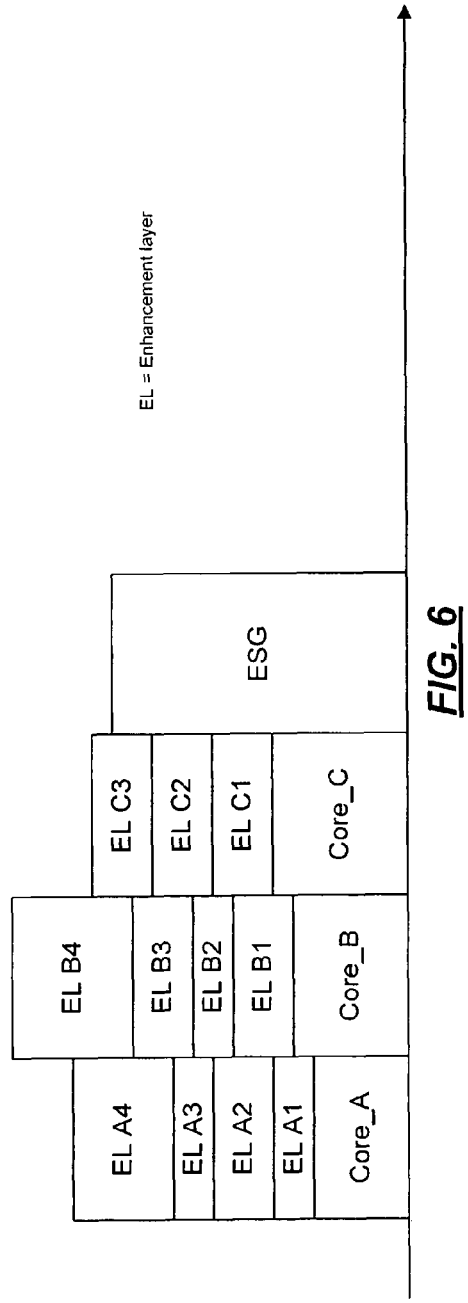
FIG. 6 is similar to FIG. 5 and shows the channel zapping data in more detail than FIG. 5 does.

FIG. 6 is similar to FIG. 5 and shows the channel zapping data in more detail than FIG. 5 does. As shown in FIG. 6, channel zapping data for service A, includes a core (also referred to as main or primary) channel zapping data and enhancement layers (A1-A4) of additional channel zapping data for channel A. The core channel zapping data provides low resolution information, and each enhancement layer adds higher resolution channel zapping information. The core zapping layer and the enhancement layers are each decodable by a scalable decoder in accordance with various aspects of the invention. As shown in FIG. 6, services B and C also comprise a core layer of channel zapping information and enhancement layers of channel zapping information.

The core layers (Core_A, Core_B, and Core_C) may use different amounts of bandwidth, as shown in FIG. 6 by the different heights of the core layers Core_A, Core_B, and Core_C. Similarly, the enhancement layers may use different amounts of bandwidth, as shown in FIG. 6 by the variations in the respective heights of the enhancement layers EL_A1-A4, EL_B1-B4, and EL_C1-C3. Channel C is shown having 3 enhancement layers, while channels A and B each have 4 enhancement layers. Other suitable numbers of enhancement layers may also be used. Different enhancement layers may be used for different aspects. For example, one layer may be used for image resolution; another layer may be used for a higher frame rate, and the like.

As is known in the art, scalable codecs can be decoded at different rates. At a low data rate, with low computational effort, they may be decoded to get a low resolution image, video, or audio. At a higher data rate, with higher computation effort, decoding will yield a higher resolution image, video, or audio. In accordance with various aspects of the invention, for channel zapping, core channel zapping information may be decoded at a relatively low data rate. In this way, fast switching between content channels is facilitated. In addition, computational effort for decoding several zapping channels is kept under control, so that devices with low computational capabilities can decode a high number of zapping channels. When not in channel zapping mode, the core channel zapping information and one or more enhancement layers may be decoded to render higher quality content to a terminal user.

As indicated in "*Scalable Codec Architectures for Internet Video-on-Demand*", Girod et al, Telecommunications Laboratory University of Erlangen-Nuremberg, Cauerst. 7, 91058 Erlangen, Germany, which is incorporated herein by reference, scalable video coding may be based on a spatio-temporal resolution pyramid. The scalable codec exploits spatio-temporal redundancies of the pyramid decomposition by an efficient compression technique. Low complexity downsampling and interpolation filters are combined with highly efficient lattice vector quantization. For intra coded picture frames (I-frames, that represent a fixed/frozen image and serve as an anchor in motion image coding), the original frame is successively filtered, and downsampled by a simple averaging filter with coefficients (1 1), separately applied in horizontal and vertical direction. The lowest resolution layer is encoded by a DPCM (differential pulse code modulation) technique. For all other layers, a spatial prediction is formed by interpolating the lower resolution layer by a filter with coefficients (1 3 3 1) again applied horizontally and vertically. Spatially predicted frames can be used for any other type of lower resolution frames. The residual prediction error quantizer may use an 8-dimensional lattice vector quantizer (LTVQ). For encoding, a 2×4 block of neighboring samples may be mapped into an 8-dimensional vector. This vector may be scaled by a factor of $1/s$, $s \gg 1$ where s corresponds to the quantizer step size in one-dimensional quantization. By varying s, the bit-rate of the quantizer can be controlled. The scaled vector, a point in $R^8$, is rounded to its nearest $E_8$-lattice point. From the obtained lattice point, an index is computed which then is transmitted to the decoder. The decoder can reconstruct the lattice point from the received index either by computation or by a simple table-lookup. By resealing the reconstructed lattice point with s, the finally constructed 2×4 input block is obtained.

Figure 7:
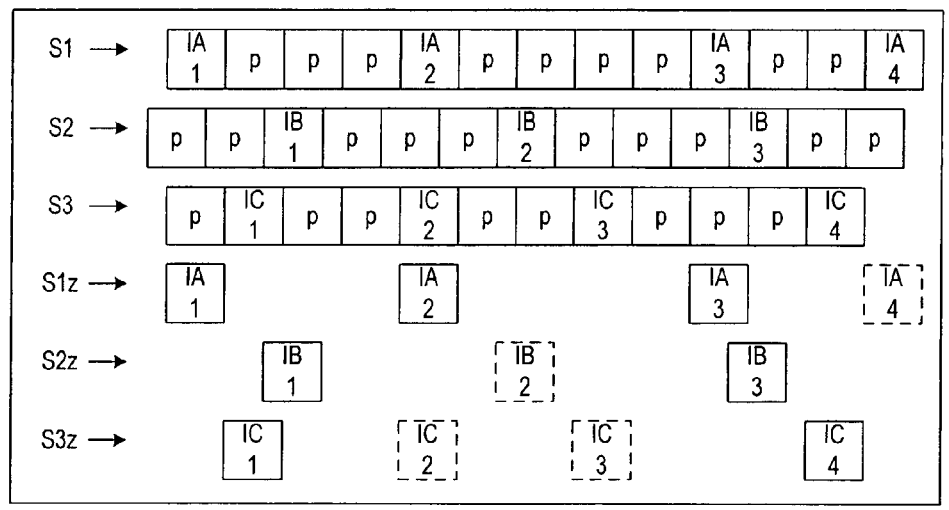
FIG. 7 illustrates selection of I-frames for use in a zapping stream according to an illustrative aspect of the invention.

According to an aspect of the invention, I-frames may be used in conjunction with zapping data for video programs. I-frames may be identified from the broadcast stream, e.g., in MPEG-2 the Group of Pictures layer (GOP) data may be used. With reference to FIG. 7, the streams S1, S2 and S3 represent program streams (IP services) that may be transmitted in one timesliced channel, e.g., channel A. In the example in FIG. 7, streams S1, S2 and S3 are video streams comprising I-frames and inter-coded frames (p- and b-frames—for simplicity both p- and b-frames are shown with 'p'). The size of the (video) frame can differ from frame to frame. The program streams may include, in addition to the video data, other data such as, e.g., audio data, text data and/or image data that is part of the program or relating to the program. The program streams may also include data not related to the program (e.g. advertisements). In the example of FIG. 7, the zapping data is formed from I-frames of each program stream S1, S2, and S3. The zapping data may also include other data selected from each program stream S1, S2, and S3, if desired. The zapping data is preferably selected so that it is representative of the program carried in the corresponding program stream(s).

All or some of the I-frames of each stream may be selected to be included in the zapping data. The selection can be different from program to program, or consistent across streams and/or programs. In FIG. 7, lines S1$z$, S2$z$, and S3$z$ represent zapping data selected from streams S1, S2, and S3. In the example of FIG. 7, the I-frames selected to be included in the zapping streams are illustrated with solid borders in streams S1$z$, S2$z$, and S3$z$, i.e., IA-1, IA-2, IA-3, IB-1, IB-3, IC1, and IC-4.

An illustrative aspect of the invention provides a mechanism for switching from zapping mode (i.e., fast channel switching to learn program content) to a real-time viewing mode of a selected program, using the electronic service guide (ESG), as further described below. If and when the user wants to return to a program from which he/she changed to zapping mode, the receiver may be turned on for receiving real-time parameters on that current channel or program. The receiver needs to receive only one (correct) section to get the delta-t for the desired content, and can then be turned off using power control mechanisms. The receiver can thus keep track of the real-time parameters for returning to the original program.

Figure 8:
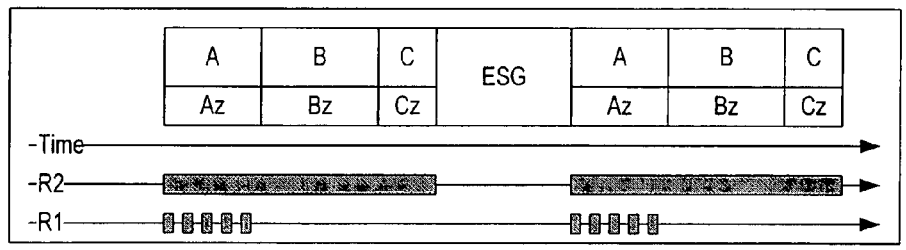
FIG. 8 illustrates a method for providing zap data in a time sliced wireless broadcasting network according to an illustrative aspect of the invention.

The receiver can tune to a desired program by accessing the ESG data. As shown in FIG. 8, the receiver may be turned on during one or more timeslice bursts, as in R1. If the receiver is turned on for the duration of all bursts, as in R2, the receiver can be 'tuned' to any program carried in the bursts. If the receiver is turned on for the duration of one burst, the programs carried in that burst can be accessed directly. Az, Bz, and Cz represent zapping data corresponding to channels A, B and C, respectively.

Figure 9:
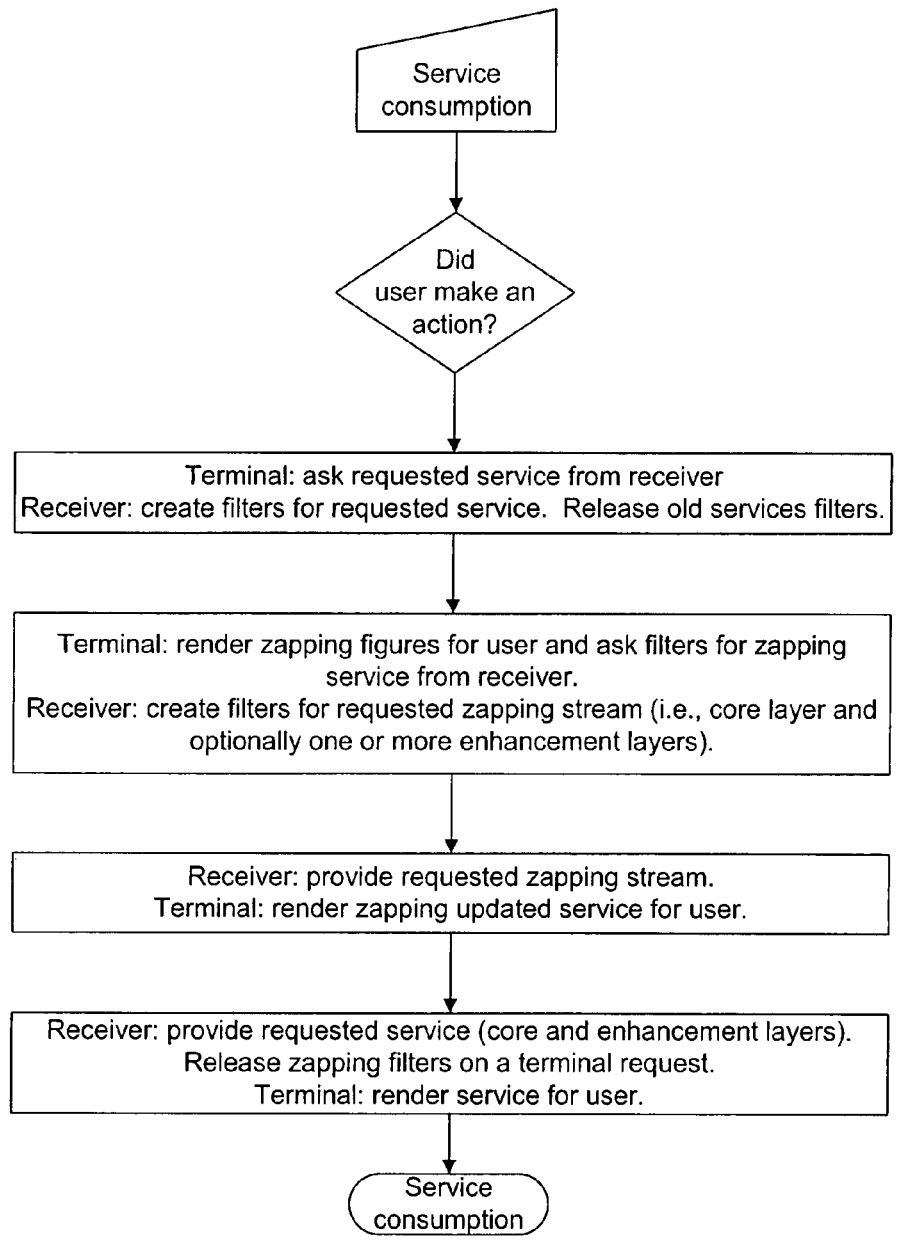
FIG. 9 illustrates a method for providing zapping information in a mobile terminal.

FIG. 9 illustrates a method for providing zapping data to a user/terminal in accordance with an aspect of the invention. For example, if the user takes an action and triggers a channel change, the terminal may request the receiver to filter out zapping data corresponding to the channel that the user tuned in. This data may be rendered to the user as soon as the filtering is done. Once the additional enhancement layer data is available, which may already be the case or which may be the case after another data burst is received, the terminal may render the higher quality content for the user.

Figure 10:
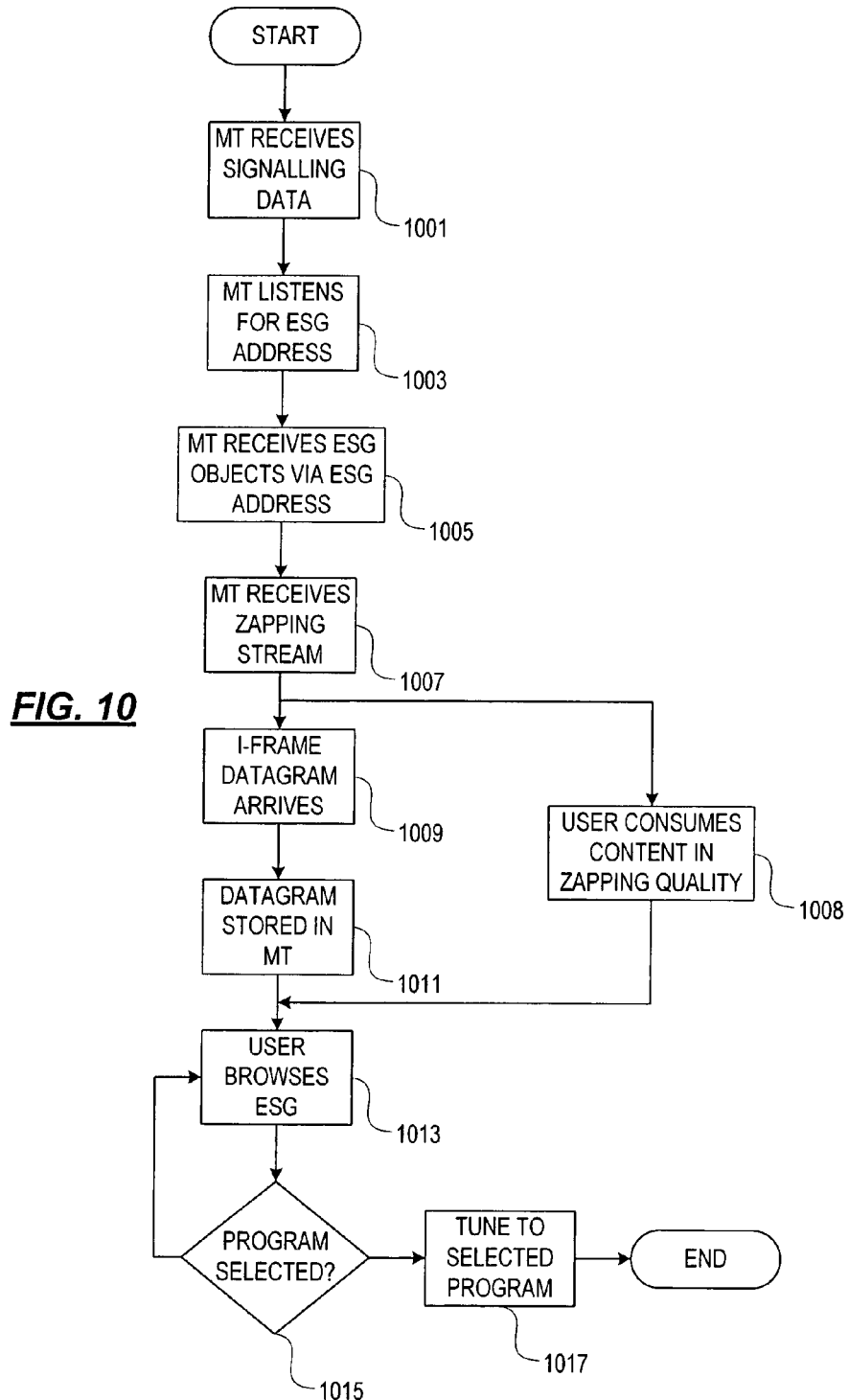
FIG. 10 illustrates a method for providing zapping data according to an illustrative aspect of the invention.

An example of receiver operation in an illustrative DVB-H embodiment is described with respect to FIG. 10. FIG. 10 illustrates a method for presenting zapping data and tuning to a desired program. A mobile terminal (not shown) in step 1001 receives PSI/SI signaling that maps IP(A), IP(B), IP(ZA), IP(ZB) and IP(ESG) to DVB-H link parameters such as PID. The mobile terminal listens in step 1003 for an IP(ESG) address (which in turn causes DVB-H tuning, filter creating, etc.) and in step 1005 starts receiving ESG objects over address IP(ESG). For each received ESG entry the mobile terminal starts receiving a zapping stream in step 1007. That is, the mobile terminal starts listening for IP(ZA), IP(ZB). In step, 1008, a terminal user consumes content in zapping quality, and processing continues at step 1013. In step 1009 a datagram arrives at address IP(ZA), the datagram being an I-frame containing zapping image data for service A. The mobile terminal knows the datagram has an I-frame because the binding is available in ESG entry 1. The same applies for other addresses IP(ZB), IP(ZC), etc. In step 1011 the received datagram is stored in mobile terminal data storage associated with ESG entry. If there is already a datagram, it is simply overwritten. This way the zapping stream updates zapping pictures for all services for which the mobile terminal has entries. In step 1013, a user browses the ESG structure going through ESG entries that are stored in terminal data storage. Browsing quickly (zapping) the entries, the terminal quickly renders the stored zapping image related to the entry (received in 1009 and stored in 1011). If the user stops browsing for T seconds at a particular entry (step 1015), the mobile terminal in step 1017 automatically tunes to the selected service D, and starts buffering and playing back the data stream from address IP(D). While buffering and starting, the terminal renders the last zapping image that was received through IP(DZ).

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present invention includes any novel feature or combination of features disclosed herein either explicitly or any generalization thereof. Any of the method steps disclosed herein can be implemented in computer software, hardware, or combinations thereof, and may be embodied on computer-readable media. Functions for selecting, forming, transmitting, receiving, processing, and displaying can be carried out using one or more processors and/or other chipsets programmed to carry out the respective functions. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:
   scalably encoding a core layer of a video stream for a digital broadcast service;
   scalably encoding at least one enhancement layer of the video stream for the digital broadcast service;
   generating signaling information that provides a mapping of the scalably encoded core layer of the video stream and
   the scalably encoded at least one enhancement layer of the video stream to a first timeslice,
   said mapping indicating to a receiver that data bursts received during the first timeslice include the scalably encoded core layer of the video stream and the scalably encoded at least one enhancement layer of the video stream;
   broadcast transmitting the signaling information in a second timeslice; and
   broadcast transmitting, in the first timeslice, a data burst including
   the scalably encoded core layer of the video stream and the scalably encoded at least one enhancement layer of the video stream.

2. The method of claim 1, wherein the core layer of the video stream includes channel zapping content that comprises a low resolution version of the digital broadcast service.

3. The method of claim 1, wherein scalably encoding the core layer of the video stream and scalably encoding the at least one enhancement layer of the video stream are both performed based on a spatio-temporal resolution pyramid and both include combining downsampling and interpolation filters with lattice vector quantization.

4. The method of claim 1, wherein
   the at least one enhancement layer of the video stream includes a first enhancement layer and a second enhancement layer, and
   wherein the first enhancement layer has a higher data resolution than the core layer of the video stream, and
   wherein the second enhancement layer includes a higher frame rate than the first enhancement layer and the core layer of the video stream.

5. The method of claim 1, further comprising:
   scalably encoding at least one second enhancement layer of data for a second digital broadcast service different from the digital broadcast service; and
   broadcast transmitting, in the first timeslice, a data burst including the scalably encoded at least one second enhancement layer of data.

6. The method of claim 5, wherein the digital broadcast service comprises a first video program stream, and the digital broadcast service comprises a second video program stream.

7. The method of claim 1, further comprising:
   scalably encoding a second core layer of data for a second digital broadcast service; and
   broadcast transmitting, in a third timeslice adjacent to the first timeslice, the scalably encoded second core layer of data, wherein the second core layer of data and the core layer of data use different amounts of bandwidth from each other.

8. A method comprising:
   during a first timeslice, receiving,
      at a computing device, signaling information that provides a mapping of a second timeslice to a scalably encoded core layer of a video stream
      and a scalably encoded at least one enhancement layer of the video stream,
      said mapping informing the computing device that data bursts received during the second timeslice include the scalably encoded core layer of the video stream and the scalably encoded at least one enhancement layer of the video stream;
   based on the signaling information, receiving, during a second timeslice, a data burst that includes the scalably encoded core layer of the video stream and the scalably encoded at least one enhancement layer of the video stream;

decoding the scalably encoded core layer of the video stream, resulting in a decoded core layer of the video stream; and rendering, as channel zapping content, the decoded core layer of the video stream.

9. The method of claim 8, further comprising:
decoding the scalably encoded at least one enhancement layer of the video stream, resulting in a decoded at least one enhancement layer of the video stream;

and rendering the decoded core layer of the video stream and the decoded at least one enhancement layer of the video stream as a primary content service.

10. The method of claim 8, wherein the scalably encoded at least one enhancement layer of the video stream includes a plurality of scalably encoded enhancement layers of the video stream, and the method further comprises:

decoding fewer than all of the plurality of scalably encoded enhancement layers of the video stream, resulting in a decoded portion of enhancement layer data; and rendering the decoded core layer of the video stream and the decoded portion of enhancement layer data as the channel zapping content.

11. The method of claim 8, wherein the channel zapping content is rendered in response to user input selecting a channel zapping service for consumption.

12. The method of claim 8, wherein the channel zapping content includes at least video content.

13. An apparatus, comprising:
one or more processors;
and memory storing executable instructions that, with the one or more processors, cause the apparatus to at least:
scalably encode a core layer of a video stream for a digital broadcast service;
scalably encode at least one enhancement layer of the video stream for the digital broadcast service;
generate signaling information that provides a mapping of a first timeslice to the scalably encoded core layer of the video stream and
the scalably encoded at least one enhancement layer of the video stream,
said mapping indicating to a receiver that data bursts received during the first timeslice include the scalably encoded core layer of the video stream
and the scalably encoded at least one enhancement layer of the video stream;
broadcast transmit, in a second timeslice,
the signaling information; and broadcast transmit, in the first timeslice,
a data burst including the scalably encoded core layer of the video stream and the scalably encoded at least one enhancement layer of the video stream.

14. The apparatus of claim 13, wherein the core layer of the video stream includes channel zapping content that comprises a low resolution version of the digital broadcast service.

15. The apparatus of claim 13, wherein scalably encoding the core layer of the video stream for the digital broadcast service and scalably encoding the at least one enhancement layer of the video stream for the digital broadcast service are both performed based on a spatio-temporal resolution pyramid and both include combining downsampling and interpolation filters with lattice vector quantization.

16. An apparatus, comprising:
one or more processors; and memory storing executable instructions that, with the one or more processors, cause the apparatus to at least:
receive, during a first timeslice, signaling information that provides a mapping of a second timeslice to a scalably encoded core layer of a video stream and a scalably encoded at least one enhancement layer of the video stream,
said mapping informing the apparatus that data bursts received during the second timeslice include the scalably encoded core layer of the video stream and the scalably encoded at least one enhancement layer of the video stream;
based on the signaling information, receive a data burst during the second timeslice that includes the scalably encoded core layer of the video stream and the scalably encoded at least one enhancement layer of the video stream;
decode the scalably encoded core layer of the video stream, resulting in a decoded core layer of the video stream; and
render, as channel zapping content, the decoded core layer of the video stream.

17. The apparatus of claim 16, wherein the executable instructions, when executed, cause the apparatus to:
decode the scalably encoded at least one enhancement layer of the video stream,
resulting in a decoded at least one enhancement layer of the video stream; and
render the decoded core layer of the video stream and the decoded at least one enhancement layer of the video stream as a primary content service.

18. The apparatus of claim 16, wherein the scalably encoded at least one enhancement layer of the video stream include a plurality of scalably encoded enhancement layers of the video stream, and
wherein the executable instructions, when executed, cause the apparatus to: decode fewer than all of the plurality of scalably encoded enhancement layers of the video stream, resulting in a decoded portion of enhancement layer data; and render the decoded core layer of the video stream and the decoded portion of enhancement layer data as the channel zapping content.

19. The apparatus of claim 16, wherein the channel zapping content is rendered in response to user input selecting a channel zapping service for consumption.

20. The apparatus of claim 16, wherein the channel zapping content includes video content.

* * * * *